(No Model.)
L. P. COOK.
OAR LOCK.
No. 379,153. Patented Mar. 6, 1888.
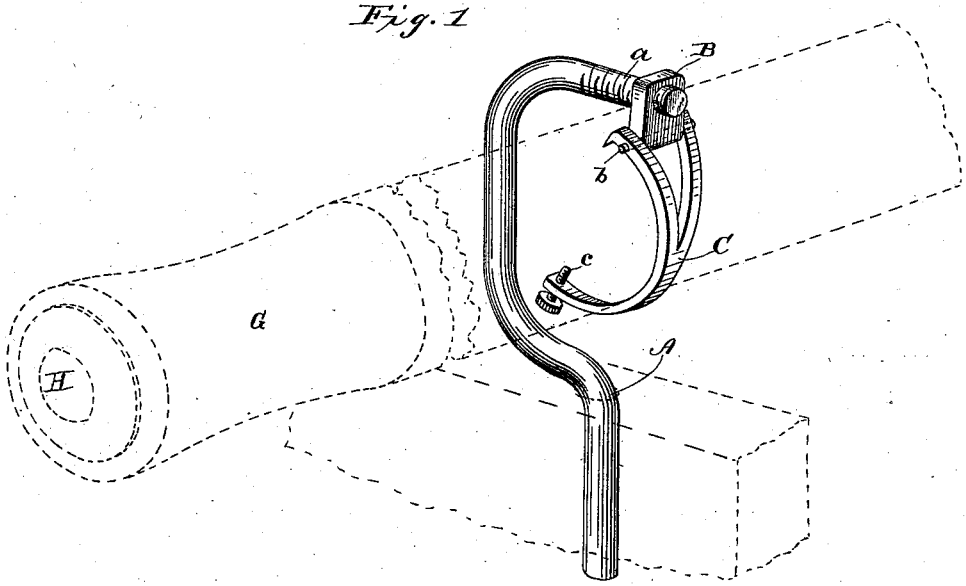
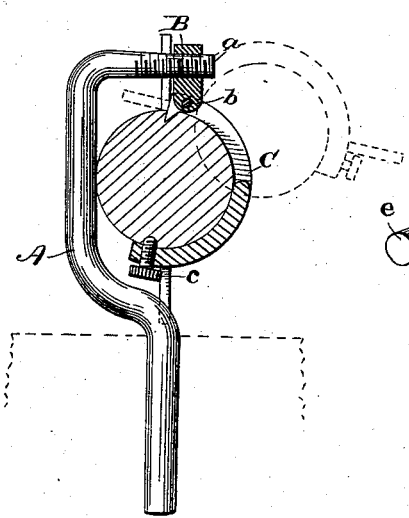
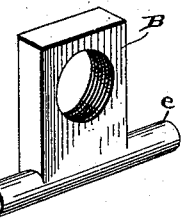
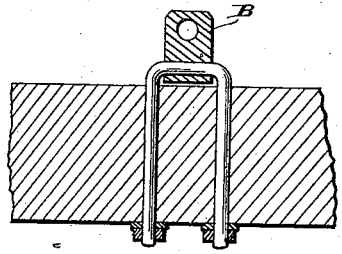
Witnesses.
Chas. R. Burr.
A. J. Stewart.
Inventor.
Lewis P. Cook,
By Church & Church
his Attorneys.

UNITED STATES PATENT OFFICE.

LEWIS P. COOK, OF HAWLEY, ASSIGNOR OF ONE-HALF TO GEORGE A. CLEARWATER, OF SCRANTON, PENNSYLVANIA.

OAR-LOCK.

SPECIFICATION forming part of Letters Patent No. 379,153, dated March 6, 1888.

Application filed November 19, 1887. Serial No. 255,620. (No model.)

*To all whom it may concern:*

Be it known that I, LEWIS P. COOK, of Hawley, in the county of Wayne and State of Pennsylvania, have invented certain new and useful Improvements in Oar-Locks; and I do hereby declare the following to be a full, clear, and exact description of the same, reference being had to the accompanying drawings, forming a part of this specification, and to the figures and letters of reference marked thereon.

It has heretofore been found that self-feathering oar-locks were expensive to make, and in practical operation they were found to be inefficient by reason of the distance of the pivotal point from the oar, causing the loss of very much of the power of the operator without any return, either in ease of movement or rapidity of propulsion, and, further, they have been universally so constructed as to adapt them for co-operation with one size of oar only, and usually only with an oar prepared especially for the purpose.

It is the object of my present invention to overcome the above-named objections and to produce an oar or row lock that will be cheap and effective with the minimum loss of power, and one adapted to co-operate with oars of various sizes and shapes, such as are ordinarily used; and to this end the said invention consists in certain novel details of construction and combinations and arrangements of parts, as will hereinafter be more fully described, and pointed out particularly in the claims at the end of this specification.
In the accompanying drawings, Figure 1 is a perspective view of an oar-lock and oar constructed in accordance with my invention, the oar being shown in dotted lines. Fig. 2 is a sectional view of the same. Figs. 3 and 4 are views of modifications, showing, respectively, a different form of screw-threaded nut and a different manner of pivotally connecting the nut to the oar.

Similar letters of reference in the several figures indicate the same parts.

The standard or support A is preferably, and for the sake of cheapness, a round rod of iron, its upper end, $a$, being screw-threaded and bent into a plane at right angles or horizontal to the lower portion, which enters the socket in the gunwale of the boat. The end $a$ is such a distance above the gunwale as to leave sufficient room for the swing of the oar, the intermediate portion of the standard being preferably curved outward, as shown clearly in Fig. 2. Screwing on the end $a$ of the standard is a nut, B, having a perforation longitudinally through one of its sides, in which the pin $b$, carrying the oar, pivots.

The clamp C, for holding the oar, is of metal, its upper end being bifurcated and provided with serrations or projections and its lower end with a set-screw, $c$, which is screwed up when the oar is properly adjusted in position.
The arms or bifurcated portion of the clamp extend on each side of the nut B and engage the ends of the pin $b$.

In applying or securing the oar in position, it is placed in the clamp and the blade brought to perpendicular position when the oar is against the standard, and so that when swung outward to its farthest extent it will not quite reach a horizontal plane. If the blade turns beyond the horizontal, the nut must be set farther back on the standard and the oar-blade turned in the clamp accordingly, and vice versa. When thus adjusted, the oar-blade will automatically assume a vertical position when placed in the water and pressure brought to bear in the proper direction, and when the oar leaves the water at the extreme of its movement it will move forward over the surface of the water by reason of the blade being slightly inclined.

In the modification shown in Fig. 3 the nut for application to the standard has studs $e$ thereon, upon which the oar swings, and in Fig. 4, instead of employing a clamp, I employ simply a U-shaped piece of metal, the base of which is confined in the nut and the arms passed through perforations in the oar, nuts or pins being applied to the ends to prevent their withdrawal.

During the fore and aft movements of the oar it pivots in the socket in the gunwale of the boat, as in the ordinary oar-lock, and as the turning or feathering of the oar is automatically accomplished without effort on the part of the operator I employ a loose or rolling handle on the inner end of the oar for him to grasp, as shown in Fig. 1, wherein G represents the handle, and H the end of the oar passing through it. This construction allows the oar itself to rotate in either direction without slipping in the operator's hands or causing him to bend his wrists, as would be the case if he grasped the solid portion of the oar or an ordinary oar were employed.

Although I have particularly described the several constituent elements of my invention, I do not wish to be limited to their exact construction, as it will be obvious to those skilled in the art to which this invention appertains that it may be modified considerably without departing from the spirit of my invention—for instance, other well-known forms of adjustable connections between the oar and standard may be used and the loose handle on the end of the oar may be entirely dispensed with.

Having thus described my invention, what I claim as new is—

1. In an oar-lock, the combination, with the standard extending over the top of the oar, of a pivotal support for the oar connected to the standard, said connection being longitudinally adjustable on the overhanging portion of the standard, substantially as described.

2. In an oar-lock, the combination, with the standard extending over the top of the oar and an adjustable nut thereon, of a pivoted connection between said nut and oar, whereby the latter is permitted a swinging movement toward and from the standard and may be adjusted nearer to or farther from the end of the same, substantially as described.

3. In an oar-lock, the combination, with the standard extending over the top of the oar, screw-threaded at its end, of a nut screwing thereon, and a pivotal connection between said nut and oar, substantially as described.

4. In an oar-lock, the combination, with the standard extending over the top of the oar, screw-threaded at its end, and a nut co-operating with said screw-threaded portion, of a clamp removably secured to the oar, having the bifurcated upper portion, the arms of which extend on either side of the nut and are connected thereto by a pivotal connection, substantially as described.

5. In an oar-lock, the combination, with the standard extending over the top of the oar, screw-threaded at its end, and a nut co-operating with said screw-threaded portion, of a clamp extending partially around the oar, provided with holding projections and a set-screw, as described, and a pivotal connection between the clamp and nut, as set forth.

6. The combination, with an automatically-feathering oar-lock, of an oar having an independent rotatable handle thereon, substantially as described.

LEWIS P. COOK.

Witnesses:
WM. H. ALT,
WM. A. VAN SICKLE.